Patented June 2, 1953

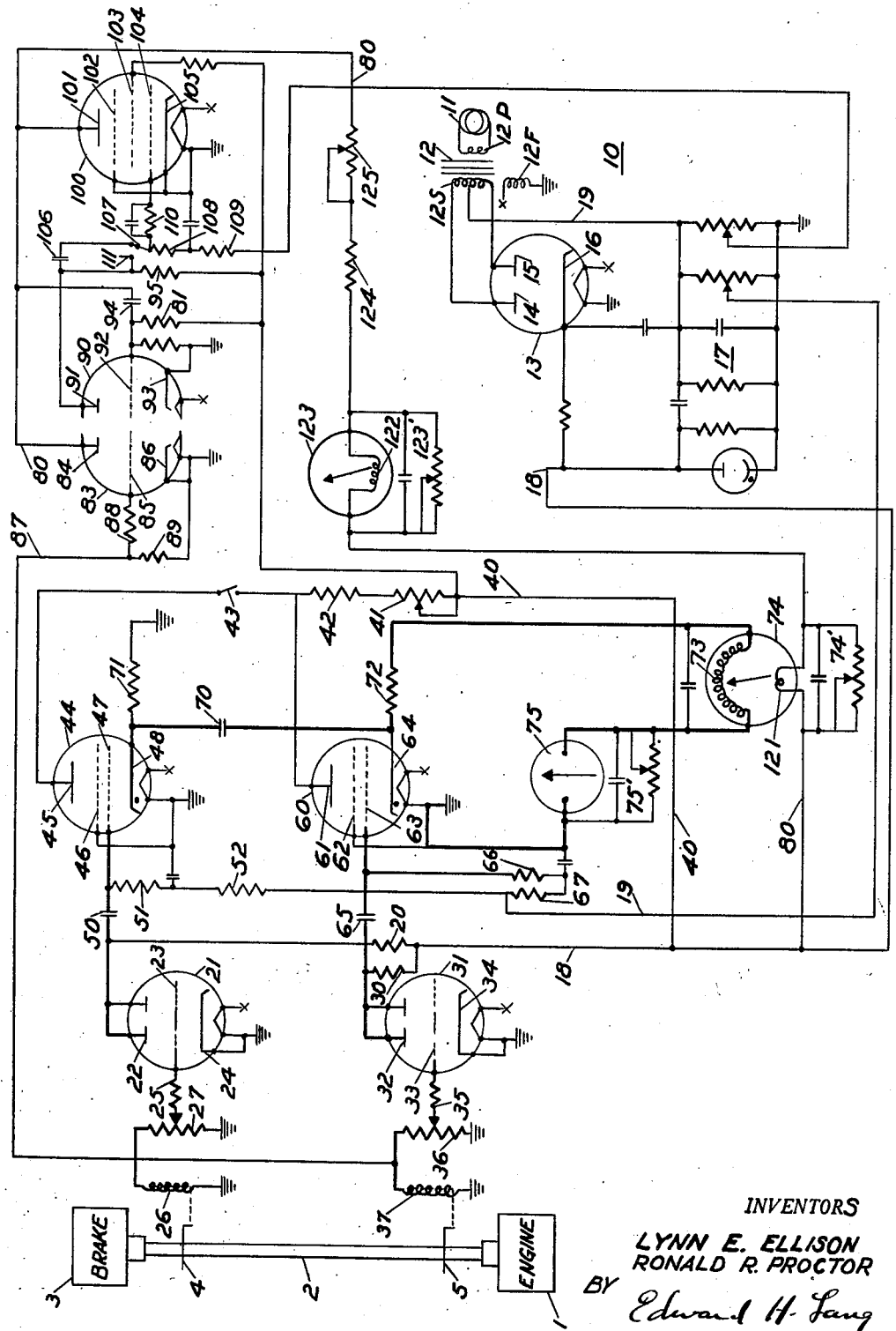

2,640,352

UNITED STATES PATENT OFFICE 2,640,352

ELECTRONIC TORQUEMETER AND HORSEPOWER INDICATOR

Lynn E. Ellison, Crystal Lake, and Ronald R. Proctor, Evanston, Ill., assignors to The Pure Oil Company, Chicago, Ill., a corporation of Ohio Application March 19, 1948, Serial No. 15,928

4 Claims. (Cl. 73—136)

This invention relates to a torque, speed and power indicator which is particularly useful in measuring the amount of power transmitted by a shaft through a measurement of its twist under load and its speed of rotation.

It is an object of the invention to provide an electronic detecting and indicating device which will measure the amount of torque developed by an engine.

It is another object of the invention to provide an electronic indicating device which will indicate directly the rate of rotation of an engine.

Another object of the invention is to provide an electrical indicating device which will measure directly the power output of an engine.

Other objects and advantages of the invention will in part be obvious and in part appear hereinafter.

Our invention comprises an apparatus for performing torque, speed and power measurements by determining the degree of twist in a shaft transmitting power, the speed of rotation of the shaft and the power deleveped thereby through determining the product of the two quantities. The apparatus includes indicating pins or studs longitudinally displaced on the shaft of a test engine, pick-up units including coils and magnets for producing electrical signals in the form of pulses from said indicating devices, and counting and integrating circuits connected to the pick-up units to determine the number and frequency of the pulses, thereby to give current indications proportional thereto, which current indications are multiplied together to delevop an indication of power developed. The arrangement of elements includes relay tubes which develop a current signal proportional to the ratio of the conducting time to the non-conducting time of one of them, which is related to the degree of twist of a power shaft and thus forms a basis for the power measurement to be made.

The drawing accompanying this specification is a diagrammatic representation of the circuit comprising the apparatus.

In the figure, 1 indicates the engine or prime mover for developing power which is connected by shaft 2 to an electrical or mechanical brake or load 3. Generally, shaft 2 will be made of steel to insure its resiliency, for when power is absorbed by load 3, shaft 2 will twist an amount proportional to the amount of power absorbed by the brake. On the shaft 2, there are mounted pins or studs 4 and 5, which are spaced longitudinally on the shaft and, by the angular displacement between them when the shaft is loaded, indicate the extent to which the shaft is twisted. The pins are preferably mounted radially on the shaft and at their outer extremities are turned at about right angles to point longitudinally along the shaft.

For convenience in tracing the circuit, the power supply will be used as a starting point and plate circuits traced therefrom. Thus, 10 indicates, in general, the power supply which consists of an alternating current generator or source 11 connected to transformer 12 having a primary coil 12p and a secondary 12s. The generated voltage is impressed on primary coil 12p, stepped up by secondary 12s and applied to rectifier tube 13. The coil 12s is center tapped and connected in conventional manner to tube 13, a duo diode, having plates 14 and 15 and cathode 16, to form a full-wave rectifier. Voltage regulation is accomplished by means of the auxiliary circuit 17 which includes a voltage regulating gas discharge tube. The high potential serving as plate voltage for the several tubes constituting the detecting and measuring circuits is applied by connection to line 18. Line 19, taken from the center point of 12s supplies bias voltages to various parts of the circuit. Filament supply for all of the tubes is obtained from coil 12f on the secondary side of transformer 12.

By means of line 18, plate voltage is supplied through plate load resistor 20 to pick-up and amplifier tube 21 having plate 22, control grid 23 and cathode 24. Signals are applied to the control grid 23 through grid resistor 25 after they are generated by coil 26 and registered as a voltage across resistor 27. Tube 21 is shown as a duo-triode, but since the plates and grids are connected together, it is effectively a single tube and is referred to as such. A single triode could be used. In a similar manner, plate voltage is supplied by line 18 through plate load resistor 30 to pick-up and amplifier tube 31 having plate 32, grid 33 and cathode 34. Signals are applied to the grid through grid resistor 35 which takes them from resistor 36 after their generation by coil 37. Like tube 21, tube 31 is shown as a duo-triode having its plates and grids connected together to form, in effect, a single tube and is referred to as such.

Plate voltage is supplied by line 40, a branch of line 18, plate load resistors 41, 42, and switch 43 to tube 44 having plate 45, grids 46 and 47, and cathode 48. Signals from pick-up and amplifier tube 21 are applied to control grid 47 of tube 44 through capacitor 50 and resistors 51 and 52, which are connected to line 19 and constitute the path back to the ground side of the power supply. Tube 44 is a gas discharge tube, commonly referred to as a thyratron, which operates intermittently as a relay tube, alternately initiating and quenching conduction in a second relay tube. Variable resistor 41 and switch 43 are used in preliminary calibration of the meter and in setting zero points.

Plate voltage is similarly applied by load resistors 41 and 42 to tube 60 having plate 61, grids 62, 63, and cathode 64. Signals obtained from pick-up unit 37 are amplified by tube 31 and applied to the control grid of tube 60 through capacitor 65 and resistors 66 and 67, which with line 19 constitute the return path to the ground side of the power supply. Like tube 44, tube 60 is a gas discharge type, or thyratron, and operates intermittently as a relay tube.

Connection between the relay tubes 44 and 60 to form a differential measuring device is made through capacitor 70, which connects the cathodes 48 and 64, respectively, of the two tubes. The path of plate current in tube 44 to ground is through resistor 71.

The path of plate current in tube 60 is through resistor 72, one coil 73 of power meter 74, through meter 75, which serves to indicate the torque, and then to ground.

Meters 74 and 75 are shunted by calibrating and damping circuits 74' and 75' respectively.

For developing a speed measurement which is multiplied with the torque measurement to indicate power, a revolution counting element is included in the circuit, which consists of an amplifying tube and an integrating tube which apply their developed signal to the power meter. Plate voltage is taken from the power supply by lines 18 and 80 through the meter circuit and applied to the amplifier tube 83 at plate 84. Tube 83 has control grid 85 and cathode 86. Signals to indicate speed are obtained from pick-up unit 37 and applied by line 87 through resistors 88 and 89 to control grid 85. Alternatively, this signal could be taken from the plate of tube 31 and applied through a small capacitor to the grid of tube 83. Tube 90 having plate 91, control grid 92, cathode 93, is resistance coupled to tube 83 and acts as a second stage of amplification, obtaining its signal through capacitor 94 from the plate of tube 83, which signal is applied to the control grid 92 of tube 90. Resistor 95 is a plate load resistor for tube 90. Resistor 81 is to provide positive bias on grid 92 of tube 90.

Plate voltage is supplied by lines 18 and 80 through the meter circuit to tube 100 having plate 101, grids 102, 103, 104, and cathode 105. Signals obtained from tube 90 are applied through capacitor 106, switch 107 and resistors 108, 109, and grid resistor 110, to the control grid 104 of tube 100. Bias voltage is obtained from the power supply through resistor 109.

Plate current for tube 100 flows from the power supply through line 80, coil 121 of meter 74, coil 122 of meter 123 and through resistors 124 and 125 to the plate 101 of tube 100 and to ground at the cathode 105. Circuits 74', 75', 123', shunting meters 74, 75 and 123, respectively, are calibration and damping circuits for the meters.

The operation of the instrument is best understood by tracing the course of a signal generated at the pick-up unit through the apparatus. To facilitate this tracing, the path of the principal signal with which measurement is made has been indicated by means of a line of double weight.

Signals to aid in the measurement of torque and speed of rotation are derived from the pins and pick-up units 26 and 37, which consist of coils wound on iron cores each having a permanent magnet placed at one end to establish a magnetic field therethrough. One end of the iron core of each pick-up unit is so placed that when pins 4 and 5 rotate, they will pass within close proximity, for example, a few thousandths of an inch from the pole pieces of the pick-up units. The passage of the pins past the pole pieces or through the magnetic fields, distorts the fields and generates a voltage in each of the coils of pick-up units 26 and 37.

The signal generated in pick-up unit 26 passes through variable resistor 27 to ground, thereby generating one cycle of alternating voltage which is impressed through resistor 25 to the control grid 23 of tube 21. When the negative half-cycle of this voltage is applied to the grid 23, the plate current drawn through resistor 20 is interrupted with a consequent rise of plate voltage appearing at plate 22. Capacitor 50 becomes charged, thereby impressing a signal on grid 47 of tube 44 by causing current to flow through resistors 51 and 52 to ground. The appearance of the positive voltage on grid 47 causes plate 45 to start drawing current which passes to ground through resistor 71 and causes the appearance of a positive voltage across capacitor 70.

The signal generated at pick-up unit 37 passes through variable resistor 36 and is impressed through the resistor 35 on the grid 33 of tube 31. When the voltage applied to the grid 33 of tube 31 is negative with respect to its cathode, the plate is caused to be cut off. The voltage at the plate rises to the value of the supply voltage and causes capacitor 65 to become charged and show an increased voltage. The current impulse is impressed through capacitor 65, onto resistors 66 and 67, at the same time causing a voltage to be applied to grid 63 of tube 60. This increase in voltage on grid 63 causes the plate 61 of tube 60 to start drawing current which flows through resistor 72 and meters 74 and 75 causing the two meters to respond to current passed by tube 60.

As indicated in the description of the layout of the circuit, tubes 44 and 60 have their cathodes connected together by capacitor 70 in order that they may function as relay tubes to switch each other on and off and thus to relate the ratio of on-time to off-time for tube 60 to the average current passed thereby. It will be noted that both thyratrons are served by the same plate load resistors 41 and 42. The fundamental operation of a thyratron is such that if a voltage is applied to the grid thereof, with circuit constants properly adjusted, a pulse applied to the grid can cause the thyratron to fire and pass current. At this point, the grid loses control and the current passes continuously, limited only by the resistance in the circuit, until the plate voltage is reduced or the cathode voltage raised. To accomplish this switching or relay action with tube 60, the second thyratron 44 is included in the circuit and draws current through the same plate resistor. This second thyratron, tube 44, is fired by the signal applied from the pick-up unit 26 with the result that the voltage drop across the plate resistors 41 and 42 increases suddenly, thereby reducing the plate voltage of conducting thyratron 60. At the time tube 44 fires, by means of the connection between the cathodes accomplished by capacitor 70, the cathode of tube 60 receives a positive pulse, which pulse is actually sufficient to make the cathode momentarily positive with respect to the plate. Thus, tube 60 is extinguished and only tube 44 passes current for the remainder of a revolution of the shaft. The current flowing through tube 44 passes to ground through resistor 71. Tube 44, therefore, conducts for the remainder of the revolution of the shaft until it receives a pulse from tube 60, initiated by pick-up 37, and is extinguished, upon which current again flows through tube 60 and the meters 74 and 75.

Thus, these meters receive current intermittently and by the arrangement of calibrating and damping circuits shunting them will indicate an average current which is dependent in value on the ratio of the on-time to the off-time of tube 60. This ratio is constant at any speed of the engine fly wheel as long as the load remains constant and there is no change of angular displacement between pins 4 and 5. When the load changes, this ratio changes accordingly.

Therefore, when shaft 2 is in its normal position under no load, pins 4 and 5 are in the relationship corresponding to the condition of no power being absorbed by the load. Such displacement of the pins as exists is then measured by the relay tubes 44 and 60 and indicated upon the meter 75 as the condition of zero torque. As the amount of power absorbed by load 3 is increased, shaft 2 will twist, thus angularly displacing pin 4 relative to pin 5. The effect of the greater relative displacement of the pins causes tube 44 to cut off current flow through tube 60, resistor 72 and meter 75 after a greater lapse of time in each revolution, thus allowing tube 60 to draw current longer and meter 75 to indicate the change of twist in shaft 2. Since the total current through meter 75 is dependent only on the ratio of on-time to off-time of the tube 60, the torque readings are independent of speed of rotation.

Speed of rotation of the shaft 2 is registered by meter 123 and combined with torque measurement to give an indication of power in meter 74 after integration by tubes 83, 90 and 100. Each time pin 5 passes the pole piece on pick-up 37 a voltage is generated which is fed through conductor 87 to resistors 88 and 89, thus being impressed upon control grid 85 in tube 83. When grid 85 swings negative, the plate current decreases, allowing the voltage on the anode to rise. This produces a voltage increase across capacitor 94 and produces a voltage upon grid 92 of tube 90. As the grid 92 turns negative with respect to its cathode, the plate current decreases, thus allowing the plate voltage to rise, which increased voltage appears across capacitor 106. With this increase in voltage across capacitor 106, current flows to switch 107 where it passes through resistors 108 and 109 back to the power supply. This current flow through resistors 108 and 109 produces a voltage, impressed through resistor 110, on grid 104 of tube 100. Control grid 104 is biased, with respect to its cathode, to the cut off point of the tube 100. When this condition exists, the plate 101 ceases to draw current, and, when grid 104 becomes positive, the anode 101 draws current.

This anode current is supplied from the power supply through lead 80 through coil 121 of meter 74, through coil 122 of meter 123, through resistors 124 and 125 and to the anode of tube 100. When the pulses from pick-up 37 are impressed upon the grid 85 and are amplified and are impressed through capacitor 94 to grid 92, the wave form on anode 91 assumes a square wave pattern. This is impressed upon grid 104 of tube 100 via capacitor 106, and resistor 110. As each pulse of current flows through meter 123, the voltage differential existing across coil 122 will produce a deflection. The shunting circuit around meter 123 is made with a sufficiently large time constant to average the current pulses. Thus, when several impulses of current have passed through coil 122, the indicating needle will move a definite amount proportional to the frequency of pulses passing through meter 123. Upon meter 74, the current pulses passing through coil 121 are averaged by the capacitor in damping circuit 74'. The variable resistor in the damping circuit 123' across meter 123 is for calibrating the currents drawn by the tube 100 when the control grid 104 of tube 100 is positive. This control grid is made positive for calibrating purposes when switch 107 is in position 111.

In order to measure the amount of power developed, it is necessary to determine the product of torque by the shaft speed. Meter 74 having two windings as shown in the figure is employed to indicate a value proportional to the product of the two currents. If either coil passes no current, the meter indicates zero. When both coils are energized, the indicator will move toward the full scale deflection. For example, if the speed of the shaft were one thousand revolutions per minute and the shaft deflection caused by the torque 5 degrees, then the power indicated upon the meter 74 would be a specific value. When the shaft is rotating at five thousand revolutions per minute under light load and shows only one degree of deflection, the meter 74 will indicate the same value, because the product of the two currents is the same.

Since changes can be made in the construction and arrangement of the apparatus described and different embodiments of the invention could be made without departing from the spirit or scope thereof, it is intended that all matter contained in the above description or shown in the accompanying drawing shall be interpreted as illustrative and not in a limiting sense.

What is claimed is:

1. A power indicating apparatus comprising, in combination with a shaft for delivering power a first voltage generating means comprising a pin on said shaft and a magnet and coil reluctance generator mounted close to said pin, being held in fixed space relationship thereto, resistance coupled amplifying means connected to said impulse generating means, a gas discharge relay tube having its grid connected to the output of said amplifying means so that it is rendered conducting by a signal therefrom, a second voltage generating unit substantially identical with said first and displaced therefrom along said shaft, a second amplifying unit substantially identical with said first, and a second gas discharge relay tube substantially like said first, said gas discharge tubes receiving their plate voltages from a common source and having their cathodes capacitively coupled whereby a time separation of the voltage pulses generated at the shaft will cause the separate tubes to conduct, but cause the one to quench the conduction of the second, resistance means connected to one of said relay tubes to conduct its current to ground and resistance means connected with the second relay tube to conduct the current signal therefrom to an averaging circuit so that the ratio of conducting to non-conducting time thereof is directly proportional to the current obtained, an amplifying stage to receive impulses from one of said voltage generating units and an integrating and measuring stage connected thereto to develop a current proportional to the speed of the shaft and means in the circuit to combine the two current quantities, thereby to indicate power.

2. In combination with a power shaft, longitudinally spaced voltage generators for producing electrical signals at a rate proportional to the rate of rotation of the shaft, an electronic circuit responsive to said electrical signals, said circuit including electronic amplifying means, electronic relay means, including cathodes, connected to each of said voltage generators to pick up amplified electrical signals therefrom and having a capacitor connected between cathodes of said relay means, said signals being separated by a time interval proportional to the amount of twist in the shaft, said relay means being actuated by said electrical signals to be rendered conducting and non-conducting successively to develop a first current signal proportional to the ratio of conducting time to non-conducting time, another electronic circuit including electronic amplifying means, having cathodes and anodes, consisting of a plurality of stages of amplification and integrating means connected to one of said voltage generators for developing a second current signal proportional only to the rate of rotation of said shaft, said stages of amplification being connected in series, metering means resistance-coupled to cathodes and anodes of said amplifying and integrating means to indicate a power quantity proportional to the product of said first and second current signals.

3. A power indicating apparatus comprising in combination with a shaft for delivering power, a first voltage impulse generating means comprising a pin on said shaft and a magnet and coil reluctance generator mounted close to said pin and held in fixed spaced relationship thereto, resistance-coupled electronic amplifying means connected to said impulse generating means, electronic relay means including a gas discharge tube connected to the output of said amplifying means, a second impulse generating unit substantially like said first and displaced longitudinally along said shaft and adapted to be displaced angularly by torque on said shaft, a second amplifying unit substantially like said first and a second relay means substantially like said first connected to said second impulse generating unit, a capacitance-coupling between the cathodes of said two relay means to cause the alternate voltage signals to render conducting and non-conducting one of said relay means, thereby to produce a current in the cathode circuit of said relay means of a magnitude proportional to the ratio of conducting time to non-conducting time and, therefore, proportional to the angular displacement of the said pins of said voltage generating means, a multiple amplifying and integrating stage connected to one of said impulse generating means and a measuring stage connected thereto to provide a current of a magnitude proportional to speed, and double-coil metering means, one coil of which is in series with the cathodes of said relay means and the other coil of which is in series with the anodes of said amplifying and integrating stage, said double-coil metering means adapted to indicate the product of the two current quantities, thereby to indicate power.

4. A power indicating apparatus comprising in combination with a shaft for delivering power, a first electrical signal generating means comprising a pin on said shaft and a coil reluctance generator mounted close to said pin being held in fixed space relationship thereto, amplifying means connected to said signal generating means, relay means connected to the output of said amplifying means, a second electrical signal generating means substantially identical with said first and displaced therefrom along said shaft, a second amplifying means substantially identical with said first and a second relay means substantially like said first connected to said second signal generating means, a capacitance coupling between the cathodes of said two relay means to cause the alternate electrical signals to render conducting and non-conducting one of said relay means, thereby to produce a cathode current proportional in magnitude to the ratio of conducting to non-conducting time and proportional to the angular displacement of said pins of said signal generating means, an amplifying stage to receive signals from one of said signal generating means, an integrating and measuring circuit responsive to said amplified signals from said amplifying stage to develop a current proportional to the speed of rotation of said shaft, and means in the circuit to combine the two current quantities, thereby to indicate power.

LYNN E. ELLISON.
RONALD R. PROCTOR.

References Cited in the file of this patent

UNITED STATES PATENTS

| Number | Name | Date |
|---|---|---|
| 2,050,866 | Tamm | Aug. 11, 1936 |
| 2,228,032 | MacGregor et al. | Jan. 7, 1941 |
| 2,402,719 | Allison | June 25, 1946 |

FOREIGN PATENTS

| Number | Country | Date |
|---|---|---|
| 417,051 | Great Britain | Sept. 21, 1934 |